United States Patent Office 3,363,390
Patented Jan. 16, 1968

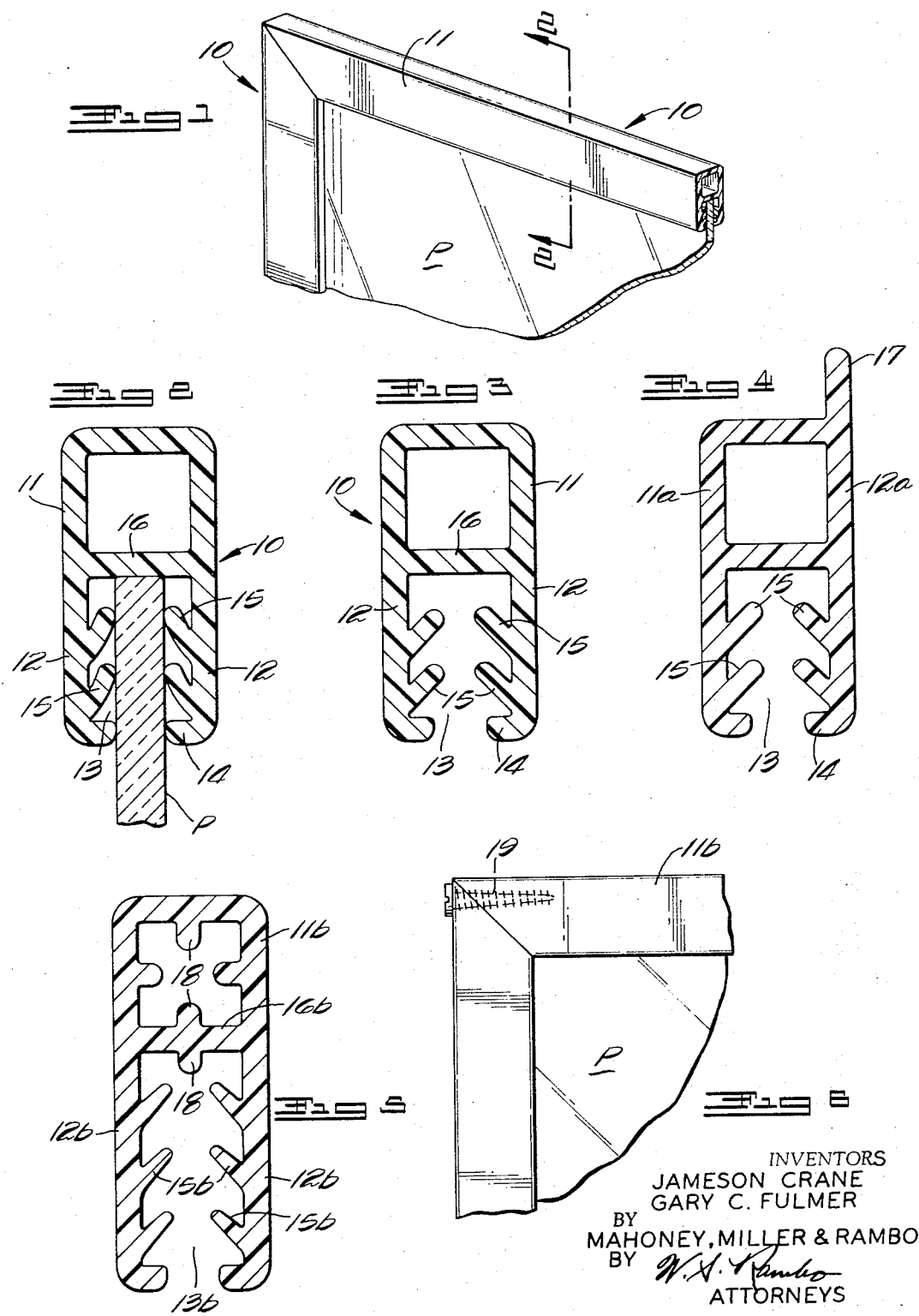

3,363,390
EXTRUDED PLASTIC PANEL-FRAMING STRIP HAVING INTEGRAL RIGID BODY SECTION AND RESILIENTLY FLEXIBLE PANEL-GRIPPING FLANGES
Jameson Crane and Gary C. Fulmer, Columbus, Ohio, assignors to Crane Plastics, Inc., Columbus, Ohio, a corporation of Ohio
Filed Apr. 25, 1966, Ser. No. 544,799
2 Claims. (Cl. 52—716)

ABSTRACT OF THE DISCLOSURE

A one-piece, extruded plastic, panel-framing strip having a rigid, channel-forming body section with integral, resiliently flexible, barb-like ribs projecting inwardly of the channel of the body section to sealingly engage and frictionally retain a panel framed by the strip.

Background of the invention

This invention relates to window frames and glazing strips, and more particularly to a combined panel-framing and glazing strip. The strip of this invention is particularly useful for framing window panes, storm window panels, or the like, without the use of other rigid framing members and without the use of separate panel-retaining brads, sealing gaskets or sealing or glazing compounds.

At the present time, it is customary in framing glass panels or the like for storm window use or similar uses, to employ rigid frame members with channels for receiving the edges of the glass panels, but these framing members require the use of separate panel-retaining brads, gaskets or glazing compounds, or a combination of these, to retain the panel in the channel in a weathertight manner. The use of these separate elements is not only expensive from the material cost but also from the labor cost involved in mounting the panel in the channel and sealing it therein.

Brief summary of the invention

The primary object of this invention is to provide a panel-framing member or glazing strip of integral, one-piece, extruded plastic construction and which is formed to include a rigid, channel-like body section having opposed side walls provided with integral, resiliently flexible, barb-like ribs or flanges which function to sealingly receive and frictionally grip and retain an edge portion of a window pane or other panel member inserted into said channel-like body section, without requiring the use of additional panel-retaining gaskets, brads or the like.

The panel-framing strips of this invention are characterized by a relatively rigid main body section which includes a pair of opposed, longitudinally coextensive, channel-forming side walls. Each of the side walls is formed with one or more longitudinally coextensive, resiliently flexible, barb-like ribs or flanges which project diagonally inwardly of the channel to yieldably receive and conform to the edge portion of a window pane or other panel inserted between the side walls of the body section. The ribs or flanges are arranged so as to facilitate the initial insertion of the edge of the pane or panel member into the channel, but to strongly resist separation of the framing strip from the panel following assembly thereof.

The body section and the flanges may be of different compatible plastic compositions or may be of the same plastic composition plasticized to different degrees. According to the present invention, it is preferred to use the same plastic compositions for the different sections with the material in the different sections plasticized to different degrees. For example, polyvinyl chloride of different durometer or hardness characteristics may be used as the plastic material. The body section will be comparatively rigid and hard, whereas the flexible barb-like flanges or ribs will be softer and more resilient with a hardness preferably ranging from 40A to 90A Shore durometer. The different hardness materials which form the respective sections of the strip are integrally merged and joined together at the orifice of the extrusion machine in a manner well known in the plastic extrusion art.

In the accompanying drawing there are illustrated several forms of the present invention but it is to be understood that these are by way of example only and the invention may take other forms without departing from basic principles.

In the drawing:

FIGURE 1 is a view partly in perspective and partly in section illustrating the strip of this invention framing a panel, one of the corners of the frame being shown.

FIGURE 2 is an enlarged transverse sectional view taken along line 2—2 of FIGURE 1.

FIGURE 3 is a view similar to FIGURE 2 but showing the strip without the panel.

FIGURE 4 is a view similar to FIGURE 3 but showing a modification of the strip.

FIGURE 5 is a view similar to FIGURE 4 but showing still another modification of the strip.

FIGURE 6 is a view in elevation illustrating the framing strip of FIGURE 5 framing a panel, one of the corners of the frame being shown.

In the several examples of the invention shown in the drawing, it will be noted in FIGURES 1, 2 and 3 that the one-piece framing strip comprises a body section 10 which includes a box-like portion 11 at one edge of the strip which has the outwardly projecting channel-framing side walls 12 extending therefrom at the opposite edge of the strip. These walls 12 are continuous along the strip and are disposed in laterally spaced parallel relationship to produce an outwardly-opening panel-receiving channel 13 therebetween (FIGURE 3). The outer edges of the side walls are provided with the longitudinally coextensive continuous inwardly projecting lips 14 which project laterally inwardly toward each other but are spaced apart sufficiently to provide a longitudinal slot of sufficient lateral extent to accommodate the thickness of the panel P (FIGURE 2) to be inserted in the channel 13 and the faces of which the inner extremities of the lips will just contact.

A very important feature of this invention is the provision of the resiliently flexible barb-like panel sealing and retaining ribs or flanges 15 on the inner surfaces of the side walls 12. These flanges are arranged in one or more pairs of opposed flanges and in this particular example there are two pairs. Thus, each wall 12 carries two flanges 15, an inner one and an outer one, and they are disposed in parallel relationship with each other and with the lip 14 and are longitudinally coextensive with the wall 12 which carries them. Each flange 15 extends diagonally inwardly at an angle toward the base formed by the adjacent transverse wall 16 of the box-like portion 11. This arrangement is such that when the edge of the panel P is inserted in the channel 13, the opposed flanges 15 will be deflected outwardly toward the walls 12 and permit complete insertion of the panel. The panel will move inwardly until it contacts the base 16 thereof. Any tendency for the panel P to move outwardly from the channel, will cause the opposed flanges 15 to swing outwardly and toward each other, thereby increasing the gripping action on the panel P. Thus, merely inserting the panel in the channel of the framing strip will cause the flanges 15 to tightly engage the faces of the panel with an effective sealing engagement and this engagement will retain the panel in the channel, the gripping and sealing action increasing as a result of any force tending to move the panel outwardly from the channel. The outer box-like portion 11 of the strip serves to strengthen and rigidify the strip and provides an insulating space along the outer edge of the strip, and a socket in which end keys can be inserted at the mitered corners of adjoining strips. However, ordinarily no corner keys or retainers will be required since the strip, when applied to the panel, will grip it to a sufficient extent and resist displacement therefrom sufficiently that the mitered corners of the type indicated in FIGURE 1, will not be disturbed. The framing strip will be retained and sealed on the panel in a weathertight condition without the use of separate elements, such as fasteners or gaskets and without the use of glazing or sealing compositions. The lips 14 will substantially close the spaces at the outer side of the channel at each face of the panel after the panel is inserted, thereby giving a more pleasing appearance as well as preventing the entrance of extraneous material into these spaces. It will be noted from FIGURE 3 that before insertion of the panel P, the barb-like flanges 15 extend laterally into the channel a greater distance than the lips 14. The lips are spaced apart substantially the thickness of the panel, whereas the opposed flanges 15 are spaced apart less than that thickness.

The framing strip illustrated in FIGURE 4 is exactly like that illustrated in FIGURES 2 and 3, with the exception of the provision of an additional flange 17 which projects outwardly from the box-like portion 11a in a common place with one of the side walls 12a but in the opposite direction. This flange 17 is used as a retaining flange and may function in mounting a framed panel in storm doors or the like.

The framing strip shown in FIGURE 5 is similar to the one illustrated in FIGURES 2 and 3 but in this example three pairs of the barb-like resiliently flexible flanges 15b are provided along the inner surfaces of the opposed side walls 12b of the strip. In addition, the box-like portion 11b is provided on the inner surface of each of its walls with an inwardly projecting longitudinally coextensive rib 18 which serves as reinforcement and also provides a longitudinal socket for end insertion of a key or screw 19 at a mitered corner as indicated in FIGURE 6. The ribs 18 are of the same material as the body of the strip and will retain the screw turned into the socket. One of the ribs 18 may also be provided on the wall 16b at the base of the channel 13b.

It will be apparent that all the examples of the framing strip of this invention which have been described above provide a framing strip which includes a relatively rigid body, having an outwardly opening panel-receiving channel, with the opposed side walls of the channel being provided with longitudinally coextensive resiliently flexible panel-engaging barb-like flanges or ribs which are directed angularly inwardly toward the base of the channel and in converging relationship with each other. The strip can be provided with many other cross-sectional shapes than those shown and described but according to this invention will always include the panel-receiving channel with the barb-like flexible flange arrangement. As previously indicated, the strip is preferably extruded as a single piece from plastic compositions of different durometer hardness so that the body portion of the strip is substantially rigid and the panel-engaging barb-like flanges are resiliently flexible.

Having thus described this invention, what is claimed is:

1. A panel-framing strip of integral, one-piece extruded plastic compositon and consisting of an elongated, rigid body section having longitudinally coextensive, relatively spaced apart, substantially inflexible side walls defining a rigid open channel for the reception of an edge portion of a panel, said side walls being formed with integral, longitudinally coextensive, resiliently flexible, barb-like ribs projecting diagonally inwardly of said channel in relatively opposed relationship and arranged to frictionally and sealingly engage the edge portion of a panel received in said channel, said ribs being of substantially softer composition than said body section and having a hardness ranging from 40A to 90A Shore durometer.

2. A panel-framing strip as defined in claim 1, wherein said body section includes a longitudinally coextensive, hollow, box-like edge portion opposite said channel.

References Cited

UNITED STATES PATENTS

| | | |
|---|---|---|
| 1,842,586 | 1/1932 | Davidson. |
| 2,778,461 | 1/1957 | Girschowitch _____ 52—731 |
| 2,840,869 | 7/1958 | Fegan _____ 52—208 |
| 3,012,642 | 12/1961 | Emmerich _____ 52—403 |
| 3,040,389 | 6/1962 | Fengler _____ 52—403 |
| 3,201,831 | 8/1965 | Cudini _____ 52—400 |
| 3,208,564 | 9/1965 | Sitterly _____ 52—211 |
| 3,220,062 | 11/1965 | Hermann _____ 52—211 |
| 3,289,377 | 12/1966 | Hetman _____ 52—731 |
| 3,310,928 | 3/1967 | Weimar _____ 52—716 |

FOREIGN PATENTS

| | | |
|---|---|---|
| 828,278 | 2/1960 | Great Britain. |
| 979,676 | 1/1965 | Great Britain. |
| 1,002,243 | 8/1965 | Great Britain. |

FRANCIS K. ZUGEL, *Primary Examiner.*

Notice of Adverse Decision in Interference

In Interference No. 96,414 involving Patent No. 3,363,390, J. Crane and G. C. Fulmer, EXTRUDED PLASTIC PANEL-FRAMING STRIP HAVING INTEGRAL RIGID BODY SECTION AND RESILIENTLY FLEXIBLE PANEL-GRIPPING FLANGES, final judgment adverse to the patentees was rendered Feb. 12, 1969, as to claims 1 and 2.

[*Official Gazette May 6, 1969.*]